US009110221B2

(12) United States Patent
Agarwal et al.

(10) Patent No.: US 9,110,221 B2
(45) Date of Patent: Aug. 18, 2015

(54) ATHERMAL PHOTONIC WAVEGUIDE WITH REFRACTIVE INDEX TUNING

(71) Applicant: Massachusetts Institute of Technology, Cambridge, MA (US)

(72) Inventors: Anuradha M. Agarwal, Weston, MA (US); Antonio Canciamilla, Olgiate Olona (IT); Francesco Morichetti, Novara (IT); Stefano Grillanda, Cernusco sul Naviglio (IT); Lionel C. Kimerling, Concord, MA (US); Andrea Melloni, Milan (IT); Jurgen Michel, Arlington, MA (US); Vivek Raghunathan, Cambridge, MA (US); Vivek Singh, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 142 days.

(21) Appl. No.: 13/763,090

(22) Filed: Feb. 8, 2013

(65) Prior Publication Data
US 2013/0243383 A1 Sep. 19, 2013

Related U.S. Application Data

(60) Provisional application No. 61/597,382, filed on Feb. 10, 2012.

(51) Int. Cl.
*G02B 6/10* (2006.01)
*G02B 6/26* (2006.01)
(Continued)

(52) U.S. Cl.
CPC ........ *G02B 6/03694* (2013.01); *G02B 6/02033* (2013.01); *G02B 6/122* (2013.01)

(58) Field of Classification Search
CPC ...... G02B 6/122; G02B 6/1221; G02B 6/132; G02B 6/02033; G02B 6/03694

USPC ............. 385/27–29, 31–32, 39, 50, 129–132, 385/141–145
See application file for complete search history.

(56) References Cited

U.S. PATENT DOCUMENTS

| 7,831,123 B2 * | 11/2010 | Sparacin et al. ............... 385/131 |
| 2007/0025410 A1 * | 2/2007 | Agarwal et al. ................. 372/94 |
| 2010/0165352 A1 * | 7/2010 | Frolov .......................... 356/477 |

FOREIGN PATENT DOCUMENTS

WO 2007011727 A1 1/2015

OTHER PUBLICATIONS

PCT/US2013/025383, International Search Report, First sheet, Continuation of First Sheet, Second sheet, and patent family annex, May 2013.
(Continued)

*Primary Examiner* — Akm Enayet Ullah
*Assistant Examiner* — Michael Mooney
(74) *Attorney, Agent, or Firm* — Theresa A. Lober

(57) ABSTRACT

In a photonic waveguide, there is provided an undercladding layer and a waveguide core, having a cross-sectional height and width, that is disposed on the undercladding layer. The waveguide core comprises a waveguide core material having a thermo-optic coefficient. A refractive index tuning cladding layer is disposed on top of the waveguide core. The refractive index tuning cladding layer comprises a refractive index tuning cladding material having an adjustable refractive index and an absorption length at a refractive index tuning radiation wavelength. A thermo-optic coefficient compensation cladding layer is disposed on top of the refractive index tuning cladding layer. The thermo-optic coefficient compensation cladding layer comprises a thermo-optic coefficient compensation material having a thermo-optic coefficient that is of opposite sign to the thermo-optic coefficient of the waveguide core material. The thermo-optic coefficient compensation cladding layer provides at least partial compensation for the waveguide core thermo-optic coefficient.

26 Claims, 3 Drawing Sheets

(51) Int. Cl.
G02B 6/00 (2006.01)
G02B 6/036 (2006.01)
G02B 6/122 (2006.01)
G02B 6/02 (2006.01)

(56) References Cited

OTHER PUBLICATIONS

PCT/US2013/025383, Written Opinion of the International Searching Authority, Form PCT/ISA/237 cover Sheet Boxes I and V, and Separate Sheet Sheets 1-3, May 2013.
Alipour et al., "Athermal performance in high-Q polymer-clad silicon microdisk resonators," Optics Letters, OSA, Optical Society of America, V. 35, N. 20, pp. 3462-3464, Oct. 2010.
Canciamilla et al., "Photo-induced trimming of chalcogenide-assisted silicon waveguides," Optics Express, V. 20, N. 14, pp. 15807-15817, Jun. 2012.
Canciamilla et al., "Visible light trimming of coupled ring-resonator filters in As2S3 chalcogenide glass technology," The European Conf. on Lasers and Electro-Optics, Nano- and Micro-Resonators (CE5), pp. CE5_5, Munich, Germany, May 2011.
Raghunathan et al., "High capacity, Photo-trimmable Athermal Silicon Waveguides," Group IV Photonics (GFP), 2012 International Conference on, WB7, three pages, Aug. 29-31, 2012.
Raghunathan et al., "Trimming of Athermal Silicon Resonators," Integrated Photonics Research, Silicon and Nanophotonics, Bionanophotonics and Si Nanophotonics (IW4C), pp. IW4C.5, Colorado Springs, CO, Jun. 17-20, 2012.
Raghunathan et al., "Athermal operation of Silicon waveguides:spectral, second order and footprint dependencies," Optics Express, V. 18, N. 17, pp. 17631-17639, Aug. 2010.
Raghunathan et al., "Co-polymer clad design for high performance athermal photonic circuits," Optics Express, V. 20, N. 19, pp. 20808-20813, Sep. 10, 2012.
Raghunathan et al., "Stability of polymer-dielectric bi-layers for athermal silicon photonics," Optics Express, V. 20, N. 14, pp. 16059-16066, Jul. 2012.
Raghunathan, "Athermal Photonic Devices and Circuits on a Silicon Platform," Thesis, Doctor of Philosophy, Massachusetts Institute of Technology, Cambridge, MA, pp. 1-166, Accessioned and available Aug. 22, 2013.
Melloni et al., "Photo-induced trimming of chalcogenide-assisted silicon photonic circuits," Invited Paper, Silicon Photonics VII, Kubby, Ed., Proc. Of SPIE V. 8266, pp. 82660A-1-82660A-8, 2012.

* cited by examiner

ATHERMAL PHOTONIC WAVEGUIDE WITH REFRACTIVE INDEX TUNING

CROSS-REFERENCE TO RELATED APPLICATIONS

This application claims the benefit of U.S. Provisional Application No. 61/597,382, filed Feb. 10, 2012, the entirety of which is hereby incorporated by reference.

STATEMENT REGARDING FEDERALLY SPONSORED RESEARCH

This invention was made with Government support under Grant No. HR0011-10-0-0009, awarded by the Defense Advanced Research Projects Agency. The Government has certain rights in the invention.

BACKGROUND

This invention relates generally to photonic waveguides, and more particularly relates to techniques for compensation of both microfabrication variation and operational thermal fluctuations in photonic waveguides.

The increasing demand for reduction in electronics power consumption, together with the increasing demand for communication bandwidth, has led to a photonic system paradigm based on the dense monolithic integration of electronic and photonic devices. In this paradigm, the integrated electronics provide computational functionality local to the integrated photonics for communication. Ultra large scale integrated (ULSI) platforms in which photonic devices are microfabricated in conjunction with monolithic electronic devices therefore bridge the gap between conventional electronics, such as CMOS electronics, and fiber optic technology, and can offer solutions to the challenges of both energy consumption and communication bandwidth associated with conventional photonic and computational systems.

Silicon-based microphotonic materials are a compelling choice for electronic-photonic integration platforms, enabling the use of established CMOS fabrication technology as well as seamless electronic-photonic device integration through monolithic integration. In addition, communication bandwidth density advantages can be achieved through the use of wavelength division multiplexing (WDM) silicon-based photonic device architecture. In addition, silicon-based photonics are characterized by strong light confinement, due to high refractive index contrast, that enables photonic integrated circuits (PICs) with large bandwidth, high selectivity, and an ultra-small footprint. The resulting performance benefits of improved power efficiency, increased functionality, enhanced reliability, and reduced cost provide strong incentives for a silicon-based, monolithic electronic-photonic device integration platform.

In the development of densely integrated silicon-based electronic-photonic device platforms, there have been discovered two significant challenges to the successful production and operation of such platforms. First, it has been found that the high refractive index contrast of silicon-based photonic materials, in combination with the sub-micrometer waveguide dimensions employed for integrated silicon-based photonics, result in a strong sensitivity to microfabrication tolerances. For example, for a single-mode silicon-based photonic waveguide, a deviation of only one nanometer from the waveguide design width to the microfabricated waveguide width can cause an effective refractive index variation of as much as $2\times10^{-3}$, producing a frequency shift of about 100 GHz in the spectral response of an interferometric device. Thus, even for the most advanced and highly accurate microfabrication processes, integrated photonic device requirements impose a severe process constraint, especially for resonant devices, as well as multi-stages and high-quality-factor devices.

Secondly, it is found that during the operation of densely-integrated electronic-photonic platforms, there can be produced significant local as well as global temperature excursions across the platform, e.g., a CMOS chip, and that such temperature excursions can prove problematic for silicon-based photonics. This sensitivity to thermal change is a result of the high thermo-optic coefficient of such materials. In particular, variations in the thermo-optic (TO) index of photonic materials can induce temperature-dependent wavelength shifts (TDWS) of, e.g., resonant photonic devices, that can limit wavelength resolution in important photonic applications such as WDM, high-resolution spectroscopy, and other applications.

With these limitations, there remain significant challenges to achieving the functionality and operational performance required of monolithically-integrated electronic-photonic device platforms. Unavoidable monolithic microfabrication inaccuracies, coupled with demanding operational conditions, require consideration of both microfabrication processes as well as device design. Successful electronic-photonic integration on a CMOS platform cannot be fully realized without the achievement of such.

SUMMARY OF THE INVENTION

In a photonic waveguide that enables successful electronic-photonic integration, there is provided an undercladding layer and a waveguide core, having a cross-sectional height and width, that is disposed on the undercladding layer. The waveguide core comprises a waveguide core material having a thermo-optic coefficient. A refractive index tuning cladding layer is disposed on top of the waveguide core. The refractive index tuning cladding layer comprises a refractive index tuning cladding material having an adjustable refractive index and an absorption length at a refractive index tuning radiation wavelength. A thermo-optic coefficient compensation cladding layer is disposed on top of the refractive index tuning cladding layer. The thermo-optic coefficient compensation cladding layer comprises a thermo-optic coefficient compensation material having a thermo-optic coefficient that is of opposite sign to the thermo-optic coefficient of the waveguide core material. The thermo-optic coefficient compensation cladding layer provides at least partial compensation for the waveguide core thermo-optic coefficient.

With this waveguide arrangement, there is provided permanent tuning of the effective index of the waveguide without changing the thermo-optic behavior of the waveguide. As a result, there is achieved both passive athermal operation with post-fabrication refractive index tuning of the waveguide structure. This index tuning provides complete compensation for microfabrication tolerances and enables the realization of tight design specifications; and with the use of photo-sensitive tuning materials, enables permanently reconfigurable devices, eliminating the need for active, power-consuming compensation techniques. The passive athermal operation produced by the TO compensation cladding layer is obtained with near complete thermo-optic compensation, eliminating the need for active temperature control. Together, these functionalities enable a wide range of photonic systems for which photonic-electronic integration is required. Other features and advantages will be apparent from the following description and accompanying figures, and from the claims.

DETAILED DESCRIPTION

Figure 1A:
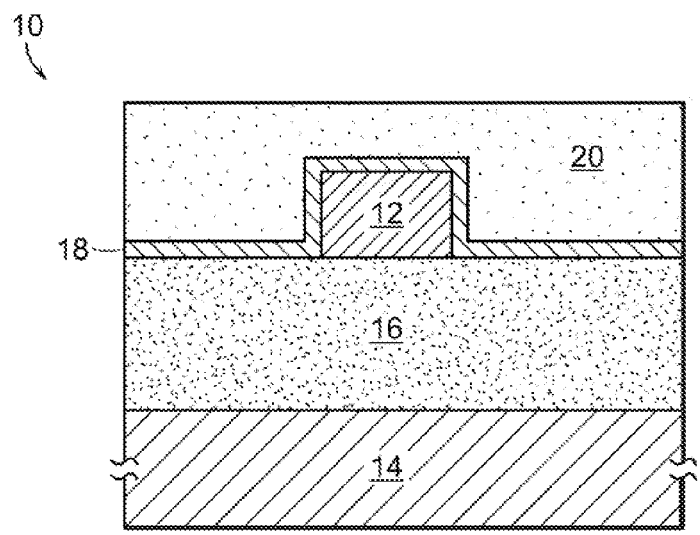
FIG. 1A is a schematic cross-sectional view of an example waveguide structure including an index tuning cladding layer and a thermo-optic coefficient compensation cladding layer over the waveguide core.

Referring to FIG. 1A, there is shown a schematic cross-sectional view of an example waveguide system 10 that provides compensation for geometric deviation due to waveguide fabrication variation, as well as compensation for operational thermal variations. As shown in the figure, the waveguide system can include a waveguide core 12, disposed on a suitable substrate 14. There can be included a bottom cladding layer, or undercladding layer 16, on the substrate surface on which the waveguide core 12 is disposed. There is provided on the waveguide core at least two upper cladding layers, namely, a refractive index tuning cladding layer 18 and a thermo-optic coefficient (TO) compensation cladding layer 20.

The waveguide 10 can be arranged in any suitable configuration for photonic device operation. For example, the configuration of FIG. 1A includes a waveguide core having a channel cross section. But other waveguide cross sections can be employed, for example, rib waveguide, strip-loaded waveguide, slot waveguide, photonic crystal waveguide, slab waveguide, and other suitable waveguide structures. The example structure of FIG. 1A is not meant to be limiting, and the waveguide design presented herein is applicable to a wide range of waveguide configurations.

Figure 1B:
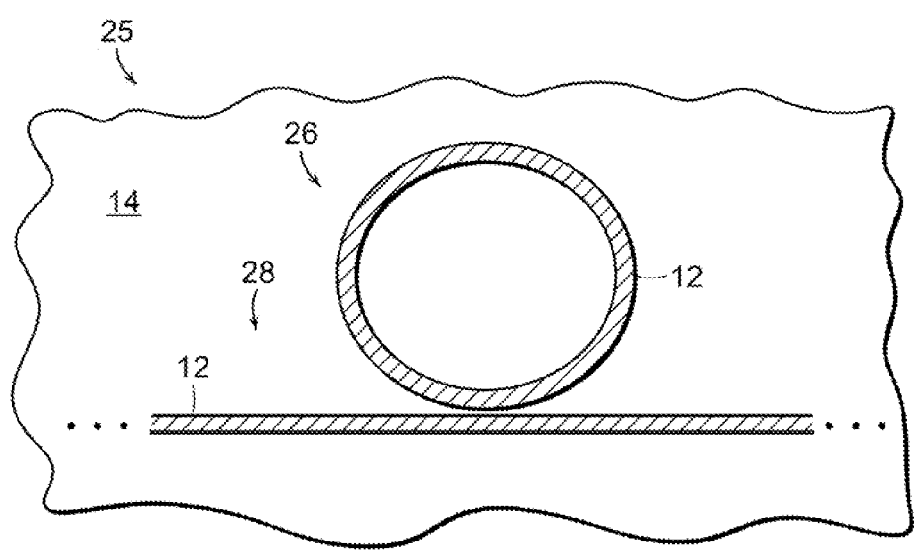
FIG. 1B is a schematic planar top-down view of the waveguide structure of FIG. 1A configured in a racetrack resonator photonic device.

Further, as shown in the schematic top-down planar view of FIG. 1B, the waveguide can be arranged in any suitable photonic device configuration, e.g., as a ring resonator 25, in a racetrack configuration as shown. For clarity, FIG. 1B shows the waveguide core 12, but it is to be recognized that all of the material layers of FIG. 1A are included in the structure of FIG. 1B. The ring resonator is a closed loop 26, e.g., a circle or ellipse, into which light can be coupled from, e.g., a waveguide bus 28. The ring resonator can be employed in a photonic circuit as, e.g., an optical add/drop filter for WDM, as a phase-shifter for polarization conversion, as an optical cavity for wavelength-tunable lasers, as an electro-optic modulator for optical switching, interferometric photonic devices, or other selected photonic circuit applications. This is but one example of a photonic device employing the waveguide 10; the waveguide 10 is not limited to a particular photonic device configuration or application.

Considering now particular arrangements that can be employed for the waveguide 10, the waveguide core 12 is disposed on a suitable microfabrication substrate 14, e.g., a silicon or silicon-based substrate, wafer, or other structure. Other suitable substrate materials include, e.g., III-V compound semiconductors, sapphire, quartz, or other suitable substrate or microelectronic wafer. The substrate can be provided with any required electronic and/or mechanical devices and topology. For example, monolithic back-end-of-line integration of photonic devices with electronic devices requires the arrangement of the waveguide 10 on top of many layers consisting of, e.g., transistors, inter-layer dielectrics, and metal contacts. For such applications, a silicon-based substrate is preferred to enable such photonic-electronic monolithic integration.

The characteristics of all of the cladding layers, including the undercladding layer 16, index tuning cladding layer 18, and the TO compensation cladding layer 20, cooperate with the waveguide core material 12 such that waveguiding occurs predominantly inside the waveguide core 12. The waveguide core can be provided as any suitable waveguiding material, as-required for a given photonics application and operating conditions, and can include, e.g., monocrystalline silicon, polycrystalline silicon, amorphous silicon (a-Si), silicon nitride ($SiN_x$), e.g., $Si_3N_4$, silicon oxy nitride (SiON), germanium, III-V compound semiconductors, II-VI compound semiconductors, IV-VI compound semiconductors, a chalcogenide such as arsenic selenide ($As_2Se_3$) or arsenic sulphide ($As_2S_3$) and germanium antimony sulphide (GeSbS), or other suitable core material. For some applications with a selected waveguide core material such as silicon, it can be preferred that the waveguide core material has a refractive index that is greater than a refractive index of each of the thermo-optic compensation cladding material, the refractive index tuning cladding material, and an under cladding layer material.

The undercladding layer 16 of the waveguide is provided primarily for confining waveguiding to the waveguide core 12. The undercladding layer can be provided as any suitable material, for example, an oxide, such as silicon dioxide, a nitride, such as silicon nitride, where the substrate is silicon-based. But the undercladding layer can be provided as any suitable material, e.g., a polymer, silicon oxy nitride, sapphire, a III-V compound semiconductor, or a chalcogenide. For many applications in which a silicon waveguide core is employed, a silicon-based oxide can be preferred for ease of microfabrication of the waveguide.

The index tuning cladding layer 18 is provided as a material that is characterized by an adjustable refractive index, here meaning that the refractive index of the material is changeable, i.e., can be changed, or adjusted, from a first index value to a second index value, either temporarily or permanently. One suitable class of adjustable refractive index materials are photosensitive materials, here meaning that the material is characterized by a refractive index that changes in response to radiation exposure. In one example of such, when the index tuning cladding layer is exposed to radiation, e.g., visible light, the index of refraction of the index tuning cladding layer is shifted, either temporarily or permanently. A suitable photosensitive material is therefore a material having a structure that is sensitive to electromagnetic radiation and that is at least relatively metastable, i.e., structurally flexible in response to radiation-induced reactions. Such reactions generally occur, for band-gapped materials, when the value of the band gap energy, $E_g$, of the photosensitive material is within the energy range of the radiation to which the material is exposed. Alternatively, such reactions can also occur for other material structures, e.g., those not having a bandgap, for which there are absorption regimes corresponding to the wavelength range of the exposed radiation. The resulting radiation-induced structural modifications in the material influence the refractive index of the material, correspondingly changing the refractive index.

In the waveguide 10 of FIG. 1A, the material composition and thickness of the index tuning cladding layer 18 are selected to enable the adjustment of the index tuning cladding layer refractive index, after microfabrication of the waveguide, to compensate for deviations in the waveguide core geometry that cause a variation in the waveguiding characteristics of the waveguide core. Specifically, given that the effective refractive index of the waveguide is a function of the refractive index of each layer of the waveguide as well as the mode penetration into each waveguide layer, then adjustment of the refractive index of the index tuning cladding layer can be conducted to compensate for a deviation of the waveguide core refractive index from its intended value due to a microfabrication process variation. This control of the index tuning cladding layer 18 enables an elegantly simple, accurate, low-cost, and for many materials, permanent, tuning of the waveguiding properties of the waveguide. Any unintended microfabrication process variations can therefore be compensated for after characterization of the fabricated waveguide geometry.

One example of a class of suitable index tuning photosensitive materials are chalcogenides (ChGs). Chalcogenides are materials having a band gap energy, $E_g$, which is in the energy range of the visible region of the electromagnetic spectrum. Chalcogenides generally are characterized by no long-range bonding order, and therefore exhibit inherent structural flexibility. As a result, visible-light band gap energy illumination of a chalcogenide material can modify the chemical bonds and local atomic structure of the chalcogenide material, with the refractive index of the chalcogenide material shifting correspondingly. Such photo-induced refractive index change may be permanent, or may be reversible, depending on the particular composition of the material and the radiation exposure conditions. Table I below lists the composition of several example suitable photo-sensitive chalcogenide materials and their band gap energy, $E_g$.

TABLE I

| Composition | $E_g$ (eV) |
|---|---|
| $As_2S_3$ | 2.26-2.4 |
| $As_2Se_3$ | 1.77 |
| $Ge_{28}Se_{60}Sb_{12}$ | 1.8 |
| $Ge_{25}Se_{75}$ | 2.07 |
| $Ge_{25}Se_{65}Te_{10}$ | 1.73 |
| $As_{22}Se_{78}$ | 1.872 |
| $As_{41}Se_{59}$ | 1.71 |
| $Ge_9As_{25}Se_{66}$ | 1.922 |

Alternatively, LTV-sensitive polymers, such as polysilane, can be employed as the index tuning cladding layer material, where LTV radiation exposure changes the refractive index of the polymer. Further, apart from leveraging photo-sensitivity to various radiation wavelengths, including, e.g., visible, gamma, UV, and E-beam wavelengths, refractive index tuning can also be realized through carrier injection or application of electric field to the index tuning material. Here, materials with either a high photorefractive coefficient or photochromic properties, or high $1^{st}$ order, $2^{nd}$ order, and $3^{rd}$ order EO coefficients, for instance, can be employed. Materials that meet this requirement include polymers such as polyimide or polyquinoline that are doped with non-linear optic chromophores, dendritic chromophores, $TiO_2$, $LiNbO_3$, or other suitable dopant.

One example of a well-suited chalcogenide, $As_2S_3$, has a band gap energy, $E_g$, of about 2.4 eV, which is within the visible region of the electromagnetic radiation spectrum. In $As_2S_3$, the S atom has a lone pair of electrons that can undergo light-induced reactions to produce structural defects, resulting in single or three-fold coordinated S species. As a result, the refractive index of $As_2S_3$ can be varied. When amorphous $As_2S_3$ is illuminated with a photon having an energy close to the band gap energy, there can occur a red shift of the absorption edge and a decrease in the band gap energy, in a process known as photo-darkening (PD), causing a corresponding increase in refractive index. Alternatively, the refractive index can also increase due to photo-polymerization reactions. There can also simultaneously occur a competing process of photo-induced volume expansion (PVE) of the $As_2S_3$ during radiation exposure, causing a blue shift of the absorption edge and a decrease in refractive index.

To ensure the domination of only one of these photo-sensitive mechanisms during radiation exposure, it can be preferred to enforce the morphology of the $As_2S_3$ layer, e.g., by annealing the layer at a temperature that is close to the glass transition temperature, as described in detail below. Annealing ensures a stoichiometric composition accompanied by densification. PD is not exhibited by stoichiometric $As_2S_3$ layers that are less than 50 nm-thick and as a result, only PVE is exhibited by such thin layers. Thicker layers on the order of 1 micron or thicker exhibit PD and the contribution of PVE becomes negligible. Therefore, such processing can be preferred to ensure a more predictive variation in the degree and direction of photo-induced shift in refractive index in $As_2S_3$. For example, the refractive index tuning cladding layer can be provided with a thickness which is at least that thickness which substantially prohibits PVE during exposure to electromagnetic radiation, thereby to enforce an increase in refractive index during the radiation exposure. Alternatively, the refractive index tuning cladding layer can be provided with a thickness which is at most that thickness for which photo-induced thickness increase is comparable to an initial refractive index tuning cladding layer thickness, thereby to enforce a decrease in refractive index during the radiation exposure.

In general, in addition to morphology, the thickness of the index tuning cladding layer is preferably also controlled, specifically to achieve a desired photo-induced shift in the refractive index of the material. The thickness of the index tuning layer is preferably large enough to obtain a desired magnitude of photo-sensitive refractive index adjustment. This desired magnitude of refractive index adjustment can be quantified by a measurement of needed post-fabrication index correction in photonic device operation. For example, given the configuration of the waveguide of FIG. 1A in a resonant photonic device like that of FIG. 1B, if due to microfabrication variation it is found in device operation that there is required a trimming of device resonance by a selected degree, e.g., 10 nm, then a corresponding change in the refractive index of the index tuning cladding layer can be imposed to obtain the needed correction. The minimum thickness of the index tuning cladding layer is therefore that thickness that can achieve at least the minimum adjustment in effective refractive index, $\Delta n_{eff}$, of the waveguide, that is expected to be required for tuning a given photonic device to compensate for fabrication variation in the waveguide core cross-sectional width or height. It is noted that this change in effective index, $\Delta n_{eff}$, produces, in any interferometric device, a corresponding wavelength shift, $\Delta\lambda$, in the transfer function of the device equal to $\Delta\lambda = \lambda_0 \Delta n_{eff}/n_g$, where $\lambda_0$ is the central wavelength and $n_g$ is the group refractive index. The refractive index tuning cladding layer therefore preferably has a thickness which is at least that thickness which adjusts the effective refractive index of the waveguide to produce a measurable variation in resonant wavelength of a resonator configuration of the waveguide.

Further in determining an appropriate thickness, $t_{itcl}$, for a photo-sensitive index tuning cladding layer, it is to be recognized that the photo-induced modification of any material is related to the magnitude of the material thickness relative to the absorption length, $1/\alpha$, of the material. This is because for thickness values, $t_{itcl}$, that are greater than the characteristic absorption length, whereby $t_{itcl} > 1/\alpha$, photo-induced modifications can occur only in an upper portion of the radiation-exposed layer, not reaching the lower depths of the layer. Conversely, uniform absorption can be ensured through the thickness of a layer if the layer thickness, $t_{itcl}$, is small relative to the absorption length, whereby $t_{itcl} < 1/\alpha$. As a result, the magnitude of index change, normalized over an entire film, is higher for an index tuning cladding layer having a thickness that is less than the absorption length that is characteristic of the material, for a given exposure dosage or photon flux. For many applications, it can be preferred to employ a refractive index tuning cladding layer having a thickness that is less than about 100 microns.

The thickness of the index tuning layer is preferably selected based on the functionality of the other cladding layers. For example, the thickness of index tuning layer is preferably small enough to allow mode expansion from the waveguide core into an upper TO compensation cladding layer 20 as shown in FIG. 1A. In one example, a TO compensation cladding layer 20 is provided to compensate for fluctuations in the refractive index of the waveguide core that occur due to changes in temperature during waveguide device operation. Such changes in operational temperature are often due to dense monolithic integration of photonic and electronic circuits, and in general, most well-suited waveguide core materials exhibit a characteristic positive thermo optic (TO) coefficient (dn/dT). In other words, most waveguide core materials are characterized by a refractive index that increases as the temperature of the microfabricated photonic circuit increases.

Table II below lists several waveguide core materials along with their refractive index and TO coefficient.

TABLE II

| Material | a-Si | Monocrystalline Si | $SiN_x$ | $As_2S_3$ |
|---|---|---|---|---|
| n @1550 nm | 3.5-4.0 | 3.48 | 1.9-2.2 | 2.4 |
| dn/dT × $10^{-4}$ $K^{-1}$ | 2.3 | 1.8 | 0.4 | 0.4 |

Considering the refractive index thermal sensitivity of the waveguide core in conjunction with the other waveguide layers, the effective refractive index variation with temperature of the entire waveguide structure of FIG. 1A, i.e., the effective TO coefficient, $$\frac{dn_{eff}}{dT}(\lambda),$$

where $\lambda$ indicates the wavelength dependence, is a function of the TO coefficient of each material in the waveguide structure of FIG. 1A, and therefore can expressed as a function of the TO coefficient of the waveguide core, $$\frac{dn_c}{dT}(\lambda),$$

the Tu coefficient of the undercladding layer, $$\frac{dn_{uc}}{dT}(\lambda),$$

the TO coefficient of the index tuning cladding layer, $$\frac{dn_{itc}}{dT}(\lambda),$$

and the TO coefficient of the TO compensation cladding layer, $$\frac{dn_{TOcc}}{dT}(\lambda),$$

as:

$$\frac{dn_{eff}}{dT}(\lambda) = \Gamma_c(\lambda)\frac{dn_c}{dT}(\lambda) + \Gamma_{uc}(\lambda)\frac{dn_{uc}}{dT}(\lambda) + \Gamma_{itc}(\lambda)\frac{dn_{itc}}{dT}(\lambda) + \Gamma_{TOcc}(\lambda)\frac{dn_{TOcc}}{dT}(\lambda); \quad (1)$$

where each TO coefficient is weighted by a respective confinement factor, $\Gamma_c(\lambda)$, $\Gamma_{uc}(\lambda)$, $\Gamma_{itc}(\lambda)$, and $\Gamma_{TOcc}(\lambda)$. The confinement factor, $\Gamma$, is a measure of the amount of light intensity in a given waveguide layer per unit input power. Expression (1) is a first order approximation of the refractive index variation with temperature where the variation of confinement factor, $\Gamma$, with temperature, and the second order variation of the refractive index of the waveguide core and cladding layers are ignored. The effect of thermal expansion coefficient of the substrate on the waveguide geometry can be considered negligible, and the wavelength dispersion of the TO coefficient, across the C band, of the core and the cladding layers, can also be neglected due to very low dispersion of the optical materials best suited for the waveguide design.

To design the waveguide structure in a manner that compensates for the refractive index dependence on operational temperature changes, first is provided a definition of athermal operation of the waveguide system of FIG. 1A. The athermal operation of the waveguide sets the effective TO coefficient, $$\frac{dn_{eff}}{dT}(\lambda),$$

of the waveguide, as expressed in expression (1), to zero, as:

$$\frac{dn_{eff}}{dT} = \sum_i \Gamma_i \frac{dn_i}{dT} = 0; \quad (2)$$

where "i" in the summation corresponds to each layer in the waveguide cross-section, as shorthand for the addition of each TO component in expression (1). The geometry and material composition of the waveguide core and cladding layers are selected to meet this condition of Expression (2), such that the waveguide materials themselves provide compensation for thermally-induced operational index changes, with the index tuning layer further specified to provide index tuning in compensation for microfabrication variations.

To achieve this design, first is considered the confinement factor, $\Gamma$, of each layer in the waveguide. The confinement factor, $\Gamma$, is contributed to by the time confinement associated with higher group index, $n_g$, of the waveguide cross-section as compared to the material index, $n_i$, of the $i^{th}$ waveguide layer, as well as the spatial confinement, $\gamma_i$, associated with the distribution of electric field intensity in the $i^{th}$ waveguide layer. The confinement factor, $\Gamma$, for each layer can therefore be expressed as:

$$\Gamma_i = \frac{n_g}{n_i} \gamma_i; \quad (3)$$

where $\gamma_i$ represents the fraction of electric field density in the $i^{th}$ waveguide layer, and can be represented as:

$$\gamma_i = \frac{\iint_i \varepsilon |E|^2 dx dy}{\iint_\infty \varepsilon |E|^2 dx dy}, \text{ where } \sum \gamma_i = 1. \quad (4)$$

The confinement factor, $\Gamma$, is also a function of the operating wavelength of the waveguide, the waveguide geometry, and the contrast of refractive index between the core material and the cladding layers. Given a preselected wavelength of photonic device operation, and given a selected waveguide core material as well as cladding materials, then in the waveguide arrangement of FIG. 1A, athermal operation can be achieved at the preselected wavelength of operation by controlling the cross-section of the waveguide core and controlling the thickness of the index tuning cladding layer. These control factors in turn change the distribution of electric field density, $\gamma_i$, in each layer and the group index, $n_g$, of the waveguide structure, to produce a confinement factor in each layer that satisfies the athermal condition of expression (2) while at the same time enabling tuning of the effective refractive index of the waveguide structure.

In practice, the definition of athermal waveguide operation is tied directly to the particular application of a given waveguide. Specifically, the maximum acceptable magnitude of the TO coefficient of a waveguide depends on the operational requirements for the waveguide. For example, considering a Si WDM system with a 20 GHz, or 0.16 nm channel spacing, experiencing an operational fluctuation in temperature of 100° C., the maximum TO peak shift would preferably be less than about 0.16/100~1.6 pm/K to ensure that the channels do not overlap. This specification translates to an effective TO coefficient requirement on the order of $2.5 \times 10^{-6}$ $K^{-1}$. This demonstrates that the maximum magnitude of TO coefficient that enables athermal operation depends on the characteristics of the operation. In this WDM example, if the channel spacing is increased from 20 GHz to 100 GHz, the maximum magnitude of the TO coefficient can increase by 5× and the operation remains athermal. Thus, the term athermal is herein not meant to imply a TO coefficient magnitude of 0, but rather a magnitude that is athermal for a given application, whereby the operation is substantially not at all impacted by operational temperature fluctuations.

To achieve athermal solutions to these design parameters, first are selected the waveguide materials that meet the photonic circuit requirements at a selected operational wavelength. The index tuning cladding layer material is selected in the manner given above, based on an intended photonic device operation. Given a selected waveguide core material having a known TO coefficient as in Table II above, then there can be selected a corresponding TO compensation cladding layer material. The TO compensation cladding layer preferably is characterized by a refractive index that is lower than that of the waveguide core, if required for a given waveguide structure, and by a TO coefficient of a sign opposite that of the waveguide core. For example, given that the well-suited waveguide core materials of Table II above all exhibit a positive TO coefficient, there is preferred the inclusion of a TO compensation cladding layer which exhibits a negative TO coefficient, to compensate for the positive TO coefficient of the waveguide core. The thickness of the TO compensation cladding layer is preferably at least that thickness which confines the optical mode in the waveguide.

It is found that most commercially-available polymer materials are characterized by a relatively low refractive index as well as a negative TO coefficient, and therefore are well-suited as TO compensation cladding layer materials. Table III below lists example polymer TO compensation cladding layer materials. Thus, any in a range of commercially available polymer materials can be employed. One commercially-available polymer material, EP, is a hyperlinked fluorinated polymer, available from Enablence, Inc., Ottowa, Ontario, CA, and is particularly well-suited as a TO compensation cladding layer with a silicon-based waveguide core material because EP is characterized by a TO coefficient of $-2.65 \times 10^{-4}$ $K^{-1}$ and a refractive index of 1.38. But non-polymer materials can also be employed as the TO compensation cladding layer. For example, $TiO_2$, and other such materials having a negative TO coefficient, can be employed with the waveguide core materials of Table II to compensate for the positive TO coefficient of those materials. Of course, should the waveguide core material be characterized by a negative TO coefficient, then the TO compensation cladding layer is implemented as a material having a positive TO coefficient.

TABLE III

| Material | PMMA | SU8 | PS | PC | EP | pPFDA | pPFDA-co-DVB |
|---|---|---|---|---|---|---|---|
| n (@1550 nm) | 1.49 | 1.57 | 1.59 | 1.56 | 1.38 | 1.33 | 1.38 |
| dn/dT (×$10^{-4}K^{-1}$) | −1.49 | −1.1 | −1.7 | −1.42 | −2.65 | −2.1 | −3.1 |

For the waveguide structure of FIG. 1A, the TO compensation cladding layer 20 is disposed on top of the index tuning cladding layer 18. It is preferred for this configuration that there be achieved good adhesion between the TO compensation cladding layer and the underlying index tuning cladding layer. For many applications, it can therefore be preferred to include an adhesion promoter, like hexamethlydisiloxane (HMDS), in the TO compensation cladding layer material composition. Further, where the TO compensation layer is disposed on top of an underlying index tuning cladding layer, it is preferred that the TO compensation layer material be optically transparent to the radiation wavelength employed for tuning the index of a photo-sensitive index tuning cladding layer.

With each of the waveguide materials thereby selected for a given operational wavelength, then the expressions above are solved to determine the index tuning cladding layer thickness and the waveguide core geometry that enable athermal photonic device operation for a waveguide material. To solve these expressions, it can be preferred to employ a photonics computer CAD tool that enables the simulation and analysis of candidate waveguide designs. The commercially-available waveguide mode solver tool FIMMWAVE, from Photon Design, Oxford, UK, is one example of a simulation tool that can be employed to simulate the waveguide mode conditions resulting from material and geometric selections, to determine an optimum geometry that provides the requisite device operation. For example, given selected cladding materials, the requisite waveguide core cross section and index tuning cladding layer thickness can be specified for a plurality of waveguide core materials, to determine the optimum waveguide core material and cross section.

In one illustrative example design process, the waveguide is specified including a bottom cladding layer, waveguide core, and upper TO compensation layer, without the inclusion of the index tuning cladding layer, and then the structure is adapted to include the index tuning cladding layer. In this example, there is specified TM mode operation at an operational wavelength of 1570 nm, with an amorphous Si (a-Si) waveguide core, with index $n_c$=3.48 and TO=2.3×10$^{-4}$ K$^{-1}$, that is disposed on a SiO$_2$ undercladding layer, with index $n_{uc}$=1.45 and TO=1×10$^{-5}$ K$^{-1}$ and a TO compensation cladding layer of the commercially-available EP polymer described above, having a refractive index $n_{TOcc}$=1.38 and TO=−2.65×10$^{-4}$ K$^{-1}$. Electromagnetic wave simulations, e.g., with the FIMMWAVE tool, infer the electric field density distributions and waveguide effective refractive index for various candidate cross-sectional geometries of the waveguide core. If the waveguide is specified to be operationally athermal when the magnitude of effective TO coefficient is ≤2.5×10$^{-6}$ K$^{-1}$, then the simulation, for an operating wavelength of 1570 nm, shows that the athermal operation is reached for an a-Si waveguide core cross-section of 500 nm×222 nm (width×height). This geometry produces about 56.1% electric field density in the a-Si ($\gamma_{a-Si}$) core region, about 20.3% electric field density in the TO compensation cladding layer, ($\gamma_{TOcc}$) and the remaining 23.6% electric field density in the SiO$_2$ under-cladding layer ($\gamma_{SiO2}$). A resulting group index of 3.63 is then used to determine the confinement factor, Γ, of each region using expression (3), which can then be employed in expression (2) to arrive at an effective TO of −1.04×10$^{-6}$.

An index tuning cladding layer of selected material, e.g., As$_2$S$_3$, with refractive index, $n_{itc}$=2.4 and TO=4×10$^{-5}$ K$^{-1}$, is then introduced into the waveguide design. Now simulating the waveguide characteristics, it is found that for an a priori thickness of 50 nm, an As$_2$S$_3$ index tuning cladding layer decreases the contrast in refractive index between the Si core and the TO compensation cladding layer. This causes the mode to be pulled away from both SiO$_2$ undercladding layer and the upper TO compensation cladding layer, and reduces the field density in each. With about 11% field confinement in the As$_2$S$_3$ and improved confinement of the amorphous silicon core, the group index increases to 4.115 and the effective TO coefficient of the system increases by an order of magnitude, to 68×10$^{-6}$ K$^{-1}$.

This design example demonstrates that to achieve index tuning capability and TO coefficient compensation capability together in the waveguide structure of FIG. 1A, the characteristics of each of the waveguide layers are to be designed in concert with the functionality requirements. As just shown, the TO coefficient of the waveguide is found to increase dramatically for a first candidate index tuning cladding layer thickness. To obtain athermal behavior with the inclusion of the index tuning cladding layer, the cladding layer thickness and/or the waveguide core geometry is therefore correspondingly adjusted so that sufficient optical mode penetrates from the waveguide core through the refractive index tuning cladding layer to the TO coefficient compensation cladding layer. In one example of such, the thickness of the core is controlled, e.g., to a thickness of 200 nm. Design simulations determine that with this reduction in core thickness from 220 nm to 200 nm, the mode is pushed further into the TO compensation layer; the electric field density in the TO compensation layer increases by 5% while the electric field density in the silicon core decreases by 8%. As a result, the effective TO coefficient of the waveguide is reduced to 9.6×10$^{-6}$ K$^{-1}$.

The effective TO coefficient of the waveguide is then further reduced by adjusting the thickness of the index tuning layer, to optimize the penetration of the optical mode into the TO coefficient compensation cladding layer. A reduction in the As$_2$S$_3$ thickness from 50 nm to 48 nm is found to change the confinement factors in each of the waveguide layers by 1%. This results in an effective TO coefficient of −0.07×10$^{-6}$ K$^{-1}$, which enables substantially athermal photonic waveguiding. Table IV below gives an example design process in which the cross section of the waveguide core and the thickness of an As$_2$S$_3$ index tuning layer are varied, with the resulting characteristics shown. The row of design values shown in bold provides a waveguide that is characterized as having obtained athermal waveguide operation in concert with index tuning capability.

TABLE IV

| Core x-section (w in nm × h in nm) | $t_{As2S3}$ (nm) | $n_g$ | $\gamma_{a-Si}$ | $\Gamma_{a-Si}$ | $\gamma_{EP}$ | $\Gamma_{EP}$ | $\gamma_{SiO2}$ | $\Gamma_{SiO2}$ | $\gamma_{As2S3}$ | $\Gamma_{As2S3}$ | TO$_{eff}$ (×10$^{-6}$ K$^{-1}$) |
|---|---|---|---|---|---|---|---|---|---|---|---|
| 500 × 222 | 50 | 4.115 | 0.592 | 0.702 | 0.133 | 0.397 | 0.162 | 0.458 | 0.113 | 0.194 | 68 |
| 500 × 200 | 50 | 3.584 | 0.477 | 0.491 | 0.179 | 0.465 | 0.224 | 0.554 | 0.120 | 0.180 | 9.6 |
| 500 × 200 | 48 | 3.563 | 0.475 | 0.487 | 0.182 | 0.470 | 0.227 | 0.559 | 0.116 | 0.172 | −0.07 |
| 500 × 200 | 200 | 3.751 | 0.469 | 0.506 | 0.059 | 0.160 | 0.096 | 0.247 | 0.376 | 0.588 | 100 |

This design is based on an operational wavelength of 1570 nm. If the operational wavelength is shifted, then the design must be iterated to accommodate the shift in TO coefficient that results. For example, at an adjusted operational wavelength of 1575 nm, the waveguide geometry must again be analyzed; here the waveguide core can be increased by 1 nm or the index tuning cladding layer thickness can be increased by 2 nm to obtain both index tuning and TO coefficient compensation at an operational wavelength of 1575 nm.

This example design scenario demonstrates that it is required to optimize the thickness of the index tuning cladding layer, with consideration to all of the other waveguide materials and particularly the cross section of the waveguide core, to achieve both athermal photonic waveguiding and refractive index tuning capabilities. Without the index tuning cladding layer, no index tuning is possible, but for an index tuning layer even as thin as 200 nm there may not be produced sufficient mode expansion into the TO compensation layer to achieve athermal operation. The index tuning cladding layer therefore is preferably thin enough to achieve at least partial compensation of the waveguide core TO coefficient while being thick enough to achieve a requisite index tuning, e.g., over a phase shift of $2\pi$ in the propagation direction of a travelling wave, or, e.g., over the free spectral range of a resonator from which the waveguide is configured. The design process just described can be extended to any suitable waveguide geometry. For example, given a waveguide with a slot cross-section, the core consists of a thin low-index region sandwiched between two high-index regions. With this arrangement, athermal waveguiding can be achieved by providing a TO coefficient compensation cladding material in the low-index slot region, whereby the TO coefficient compensation cladding layer is included in the core cross section. Similarly, given a waveguide with a strip-loaded geometry, the core of a strip, i.e., channel, of high-index material is disposed on top of a lower-index slab layer. With this arrangement, the refractive index tuning layer material can be provided as the lower-index slab material, whereby the refractive index tuning cladding layer is included in the core cross section. The TO coefficient compensation cladding layer material and the refractive index tuning cladding layer material can therefore be included as part of the waveguide core for any suitable waveguide index profile.

Turning now to microfabrication processes for producing the waveguide, for many applications, procedures from a silicon-based CMOS process can be employed. But no particular microfabrication or other fabrication process is required, and any suitable manufacturing can be conducted. One example process is herein described, but such is not meant to be limiting. In this example, there is microfabricated a photonic waveguide resonator having a configuration like that of FIGS. 1A-1B. In the process, a suitable substrate, e.g., silicon, is employed. An undercladding layer of silicon dioxide is produced on the silicon substrate by thermal oxidation of the substrate, or can be provided as a silicon-on-insulator substrate (SOI), with the silicon layer employed as the waveguide core on the thick lower insulating material. Where an SOI structure is not employed, an oxide layer can be deposited, as, e.g., about 3 μm in thickness.

A waveguide core of amorphous silicon is produced by, e.g, plasma enhanced chemical vapor deposition (PECVD) at a temperature of about 200° C. using silane gas ($SiH_4$) at a flow of about 60 sccm, and argon gas (Ar) at a flow of about 300 sccm. The thickness of the waveguide core corresponds to the waveguide core cross section found to enable athermal behavior with a TO compensation cladding layer; in one example, the amorphous silicon layer is about 205 nm-thick.

It is known that the presence of dangling bonds in amorphous silicon can result in the production of mid-energy-gap states that can act as absorption centers for sub-bandgap light, and are the main source of IR absorption in amorphous silicon. This material absorption can be reduced significantly by passivating the dangling bonds through hydrogenation of the amorphous silicon layer. Hydrogenated a-Si (a-Si:H) is therefore preferred for enabling low loss, passive waveguide applications. PECVD is a particularly well-suited deposition technique for achieving such, because imperfect dissociation of the $SiH_4$ precursor results in hydrogen incorporation into the depositing amorphous silicon layer. As a result, PECVD process power is preferably controlled to optimize the hydrogen content in the amorphous silicon layer. Lower deposition power reduces the kinetic energy available for $SiH_4$ dissociation, thereby increasing the H content of the amorphous silicon layer and decreasing the material absorption loss. An example PECVD process power of about 50 W is found to enable adequate hydrogenation.

With a blanket coating of the waveguide core layer material, the layer is photolithographically patterned, preferably employing a positive photoresist, in the desired photonic device configuration, e.g., resonator rings like that of FIG. 1B. It is preferred that an adhesion promoter, such as hexamethyldisiloxane (HMDS) first be coated on the amorphous silicon surface and baked at, e.g., 130° C. A suitable photoresist, e.g., MEGAPOSIT™ SPR™ from Dow Chemical Company, Marlborough, Mass., of, e.g., about 1 μm in thickness, is then spin-applied and pre-baked at, e.g., about 95° C. for 60 s. A suitable photolithographic exposure stepper, e.g., an i-line stepper with wavelength of 365 nm is then employed for photolithography. It is recognized that higher photolithography resolution can be achieved with a shorter wavelength source, such as extreme UV lithography, e-beam lithography, or X-ray lithography, or by increasing the index of the photoresist, e.g., through water or oil-immersion lithography, and such can be preferred for various applications. Given an i-line stepper and a 205 nm-thick amorphous silicon waveguide core layer, an exposure time of 160 ms can be optimal for many applications. After exposure, a post-exposure bake of the photoresist can be conducted at, e.g., about 115° C. The photoresist is then developed, e.g., with MEGAPOST LDD-26W, from Dow Chemical Company, Marlborough, Mass., and baked at, e.g., about 130 Dow Chemical Company, Marlborough, Mass., of for 60 s.

The width of the waveguide core is then set by plasma etching of the amorphous silicon layer, e.g., with a width of 500 nm; given the 205 nm height, this corresponds to TM waveguide operation. Here a cl2/HBr plasma etch chemistry can be employed, preferably after an initial photoresist descum etch step with an $O_2$ plasma at a flow of 30 sccm and 150 mTorr for 5 s at 100 W and an oxide layer etch with $CF_4$ flow of 30 sccm at 100 mTorr and 400 W. The $cl_2$/HBr etch is then conducted at, e.g., 350 W for 50 s and a pressure of 200 mTorr, with $cl_2$ flowing at 20 sccm and HBr flowing at 20 sccm. An over-etch step can be carried out at a lower power, e.g., 75 W for 10 s, with HBr at flowing at 40 sccm and 100 mTorr. At the completion of amorphous silicon etching, the remaining photoresist layer can be stripped, e.g., using an asher process.

An index tuning cladding layer of $As_2S_3$ of 50 nm in thickness is then thermally evaporated over the device. A suitable adhesion promoter, e.g., HMDS, is then deposited on the index tuning cladding layer, and the TO compensation cladding layer is then deposited. For most polymer TO compensation cladding layer materials, spin-coating can be employed, for producing a TO compensation layer thickness of, e.g., 3 μm. The polymer layer is UV cured for about 20 minutes, e.g., with a 5 mW/cm² short arc mercury lamp. The assembly is then annealed, preferably in vacuum, at, e.g., about 150° C. for, e.g., about 4 hours, to set the morphology of the index tuning layer material and to stabilize the TO compensation cladding layer properties.

With this annealing step complete, the waveguide device can be tuned to compensate for microfabrication process variations. After testing the device performance to determine a required degree of index tuning, the tuning process parameters for achieving such are set.

For example, to tune the refractive index of a 50 nm-thick $As_2S_3$ index tuning layer, visible light radiation, having a wavelength between 450 nm-650 nm, is provided from a halogen lamp, with a suitable intensity, e.g., 10 mW/cm². The radiation is coupled to an optical fiber with a suitable mode field diameter, e.g. 30 μm, that is controllably positioned on the substrate to selectively expose particular locations, e.g., the resonator ring location. The index tuning rate can be increased by increasing the intensity of the visible light source. It is notable that if the waveguide design consists only of semiconductors and dielectrics, then the wavelength of the tuning radiation is preferably less than the wavelength of the signal light that is to be transmitted through the waveguide structure. With tuning complete, the photonic waveguide device is optimized for photonic device performance.

Example I

The waveguide structure of FIG. 1A was microfabricated as a racetrack resonator structure as in FIG. 1B. The closed loop 26 of the resonator had a bending radius of 20 μm and was disposed adjacent to a bus waveguide 28, with a coupling length of 100 μm and a gap of 600 nm in the coupling section. The waveguide structure was microfabricated with an amorphous waveguide core of 500 nm×205 nm and 205 nm in thickness, on a 3 μm-thick $SiO_2$ undercladding layer, atop a silicon substrate. A photo-sensitive refractive index tuning cladding layer of $As_2S_3$, with 50 nm in thickness, was provided on the waveguide core, and a TO compensation cladding layer of the commercially available polymer EP, from Enablence, Inc., with 3 μm in thickness was provided on the index tuning cladding layer. The structure was annealed in the manner described above.

Figure 2:
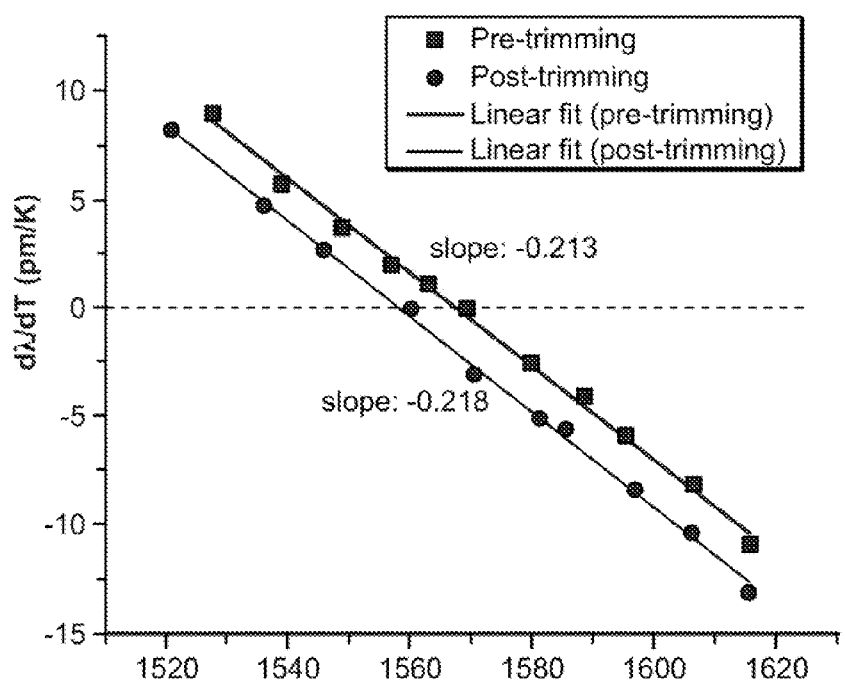
FIG. 2 is a plot of the experimentally measured thermo-optic performance of an experimental waveguide having the structure of FIGS. 1A-1B, before and after the refractive index of the waveguide is tuned.

The operation of the resulting photonic device was investigated before and after exposing the structure to illumination to tune the refractive index of the device. In particular, the athermal characteristic of the device, under TM operation, was analyzed. FIG. 2 provides a plot of the measured TO performance between a temperature of 20° C.-40° C., prior to refractive index tuning, revealing no appreciable TO shift around an operating wavelength of 1570 nm. Moreover, across a bandwidth of about 50 nm, temperature dependence of the waveguide is lower than 5 pm/K, with any variation in wavelength arising from waveguide dispersion. This temperature dependence is one order of magnitude lower than conventional SOI waveguides, which generally exhibit a temperature dependence of about 50 pm/K for TM polarization and about 70 pm/K for polarization.

After such measurement, the device was exposed to 10 mW/cm² of visible light from a halogen source. This shifted the resonance wavelength by 10 nm (~1.21 THz) at a wavelength trimming rate of 8.5 pm/min (~1 GHz/min), with no evidence of saturation after 1200 minutes of exposure. This corresponds to a variation of about 2.36×10⁻² in the effective index of the waveguide and 0.13 in the refractive index of the $As_2S_3$ chalcogenide.

FIG. 2 also provides a plot of the measured TO performance after adjustment of the index tuning cladding layer refractive index. These measurements demonstrate a blue-shift in athermal resonance from 1570 nm to 1560 nm. Unaltered post-tuning athermal performance around 1560 nm indicates nullification of increased index-contrast at the interface of the amorphous silicon and $As_2S_3$, with a corresponding decreased index-contrast at the $As_2S_3$/EP interface. This demonstrates the possibility of tuning the "athermal point" of the waveguide across a large bandwidth, e.g., 10 nm.

Example II

Figure 3:
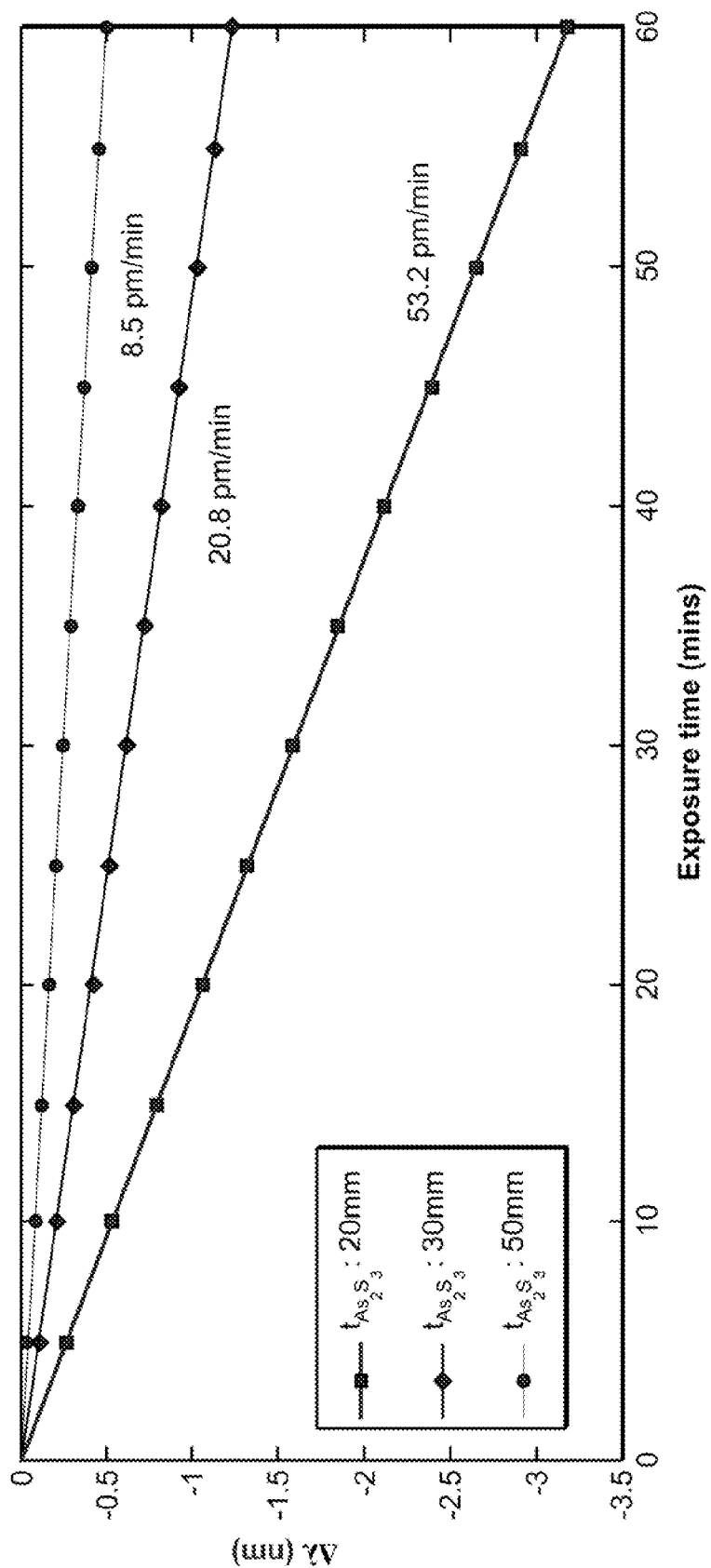
FIG. 3 is a plot of the change in the resonant wavelength of a waveguide resonator like that of FIG. 1B as induced by index changes in the refractive index tuning cladding layer for three separate layers of the chalcogenide $As_2S_3$ having thicknesses of 20 nm, 30 nm, and 50 nm, respectively.

The rate of refractive index tuning of the photo-sensitive chalcogenide $As_2S_3$ was investigated. Three refractive index cladding layers of $As_2S_3$ were separately formed, having thicknesses of 20 nm, 30 nm, and 50 nm on the waveguide structure of FIGS. 1A-1B. The devices with various thicknesses of $As_2S_3$ were to visible light radiation from a halogen lamp that was coupled to an optical fiber controllably disposed on the material. The magnitude of each device's resonant wavelength change induced by the photo-induced refractive index change was examined as a function of exposure time. FIG. 3 is a plot of such for each of the three different material thickness devices. As seen by the plot, the magnitude of wavelength change is higher for a thinner $As_2S_3$ for a given exposure time. In other words, the magnitude of index change is inversely proportional to the thickness, where $\Delta n_{As2S3}/n_{As2S3} = \times t_{As2S3}/t_{As2S3}$ for a given exposure dosage. The observed blue-shift in the resonance wavelength, reported above, corresponding to a decrease in the index of $As_2S_3$, suggests that the dominant photosensitive mechanism in annealed $As_2S_3$ layers is photo-volume expansion (PVE). This is further validated by the dependence of trimming rate on the initial thickness of annealed $As_2S_3$ ($t_{As2s3}$)

With these examples and the description above, it is demonstrated that the waveguide structure including both an index tuning cladding layer and a TO compensation cladding layer enables permanent tuning of the effective index of the waveguide without changing the thermo-optic behavior of the waveguide. As a result, there is achieved both passive athermal operation with post-fabrication refractive index tuning of the waveguide structure. This index tuning provides complete compensation for microfabrication tolerances and enables the realization of tight design specifications; and with the use of photo-sensitive tuning materials, enables permanently reconfigurable devices, eliminating the need for active, power-consuming compensation techniques. The passive athermal operation produced by the TO compensation cladding layer is obtained with near complete thermo-optic compensation, eliminating the need for active temperature control. Together, these functionalities enable a wide range of photonic systems for which photonic-electronic integration is required.

It is recognized that those skilled in the art may make various modifications and additions to the embodiments described above without departing from the spirit and scope of the present contribution to the art. Accordingly, it is to be understood that the protection sought to be afforded hereby should be deemed to extend to the subject matter claims and all equivalents thereof fairly within the scope of the invention.

We claim:

1. A photonic waveguide comprising:
   an undercladding layer;
   a waveguide core having a cross-sectional height and width disposed on the undercladding layer and comprising a waveguide core material having a thermo-optic coefficient;

a refractive index tuning cladding layer disposed on top of the waveguide core and comprising a refractive index tuning cladding material having an adjustable refractive index and an absorption length at a refractive index tuning radiation wavelength; and a thermo-optic coefficient compensation cladding layer disposed on top of the refractive index tuning cladding layer and comprising a thermo-optic coefficient compensation material having a thermo-optic coefficient that is of opposite sign to the thermo-optic coefficient of the waveguide core material and that provides at least partial compensation for the waveguide core thermo-optic coefficient.

2. The photonic waveguide of claim 1 wherein the refractive index tuning cladding layer has a thickness which is at most that thickness which produces optical mode penetration from the waveguide core through the refractive index tuning cladding layer to the thermo-optic coefficient compensation layer for substantially athermal photonic waveguiding.

3. The photonic waveguide of claim 1 wherein the waveguide core thickness and the refractive index tuning cladding layer thickness are at most the core thickness and refractive index tuning cladding layer thickness, respectively, that produces optical mode penetration from the waveguide core through the refractive index tuning cladding layer to the thermo-optic coefficient compensation layer for substantially athermal photonic waveguiding.

4. The photonic waveguide of claim 1 wherein the refractive index tuning cladding layer has a thickness which is at least that thickness which adjusts effective refractive index of the waveguide upon exposure to the refractive index tuning radiation wavelength, and which is at most that thickness which produces optical mode penetration from the waveguide core through the refractive index tuning cladding layer to the thermo-optic coefficient compensation layer for substantially athermal photonic waveguiding.

5. The photonic waveguide of claim 1 wherein the refractive index tuning cladding layer has a thickness which is at least that thickness which adjusts effective refractive index of the waveguide to produce a measurable variation in resonant wavelength of a resonator configuration of the waveguide, and which is at most that thickness which produces optical mode penetration from the waveguide core through the refractive index tuning cladding layer to the thermo-optic coefficient compensation layer for substantially athermal photonic waveguiding in the resonator configuration.

6. The photonic waveguide of claim 1 wherein the refractive index tuning cladding layer has a thickness that is less than about 100 microns.

7. The photonic waveguide of claim 1 wherein the refractive index tuning cladding layer has a thickness that is less than the absorption length of the refractive index tuning cladding material at the refractive index tuning radiation wavelength.

8. The photonic waveguide of claim 1 wherein the refractive index tuning cladding layer has a thickness which is at least that thickness which enables adjustment of effective refractive index of the waveguide that compensates for a fabrication variation in the waveguide core cross-sectional width or height.

9. The photonic waveguide of claim 1 wherein the refractive index tuning cladding material comprises a material having a refractive index that is changed by exposure to electromagnetic radiation.

10. The photonic waveguide of claim 1 wherein the refractive index tuning cladding material comprises a photo-sensitive material having a refractive index that is changed by exposure to visible light.

11. The photonic waveguide of claim 1 wherein the refractive index tuning cladding material comprises a chalcogenide.

12. The photonic waveguide of claim 1 wherein the thermo-optic coefficient compensation material comprises a substantially transparent polymer.

13. The photonic waveguide of claim 1 wherein the thermo-optic coefficient compensation material comprises a polymer selected from the group consisting of poly(methyl methacrylate), polystyrene, polycarbonate, polyimides, fluorinated polyimides, halogenated polyacrylates, perfluorocyclobutyl aryl ethers, dendrimers, fluorinated dendrimers, hyperbranched polymers, poly(perfluorodecyl acrylate) and polymer blends (co-polymers).

14. The photonic waveguide of claim 1 wherein the waveguide core material is selected from the group consisting of monocrystalline silicon, polycrystalline silicon, amorphous silicon, silicon nitride, silicon oxynitride, germanium, III-V compound semiconductors, II-VI compound semiconductors, IV-VI compound semiconductors, and chalcogenides.

15. The photonic waveguide of claim 1 wherein the substrate comprises a material selected from the group consisting of silicon, III-V semiconductors, sapphire and quartz.

16. The photonic waveguide of claim 1 wherein the undercladding layer comprises a material selected from the group consisting of oxides, nitrides, polymers, silicon oxy nitride, sapphire, III-V compound semiconductors, chalcogenides, air, and porous materials.

17. The photonic waveguide of claim 1 wherein the waveguide core material has a refractive index that is greater than a refractive index of each of the thermo-optic compensation cladding material, the refractive index tuning cladding material, and an under cladding layer material.

18. The photonic waveguide of claim 1 wherein the waveguide core comprises silicon, the thermo-optic compensation cladding material comprises a polymer having a negative thermo-optic coefficient, and the refractive index tuning cladding material comprises a chalcogenide.

19. The photonic waveguide of claim 18 wherein the refractive index tuning cladding layer has a thickness that is less than the absorption length of the refractive index tuning cladding material.

20. The photonic waveguide of claim 1 wherein the waveguide core cross section forms a closed loop.

21. The photonic waveguide of claim 1 wherein the waveguide core cross section forms an interferometric photonic device.

22. The photonic waveguide of claim 1 wherein the waveguide core is selected from the group consisting of channel waveguide, ridge waveguide, strip-loaded waveguide, slot waveguide, photonic crystal waveguide, and slab waveguide.

23. The photonic waveguide of claim 1 wherein the refractive index tuning cladding layer is included in the core cross section.

24. The photonic waveguide of claim 1 wherein the thermo-optic coefficient compensation cladding layer is included in the core cross section.

25. The photonic waveguide of claim 9 wherein the refractive index tuning cladding layer has a thickness which is at least that thickness which substantially prohibits photo-induced volume expansion during exposure to electromagnetic radiation, thereby to enforce an increase in refractive index during the radiation exposure.

26. The photonic waveguide of claim 1 wherein the refractive index tuning cladding layer has a thickness which is at most that thickness for which photo-induced thickness increase is comparable to an initial refractive index tuning cladding layer thickness, thereby to enforce a decrease in refractive index during the radiation exposure.

\* \* \* \* \*